Jan. 7, 1958     J. H. JOHNSTON     2,819,383
METHOD OF ARC WELDING TITANIUM
Filed Sept. 20, 1952
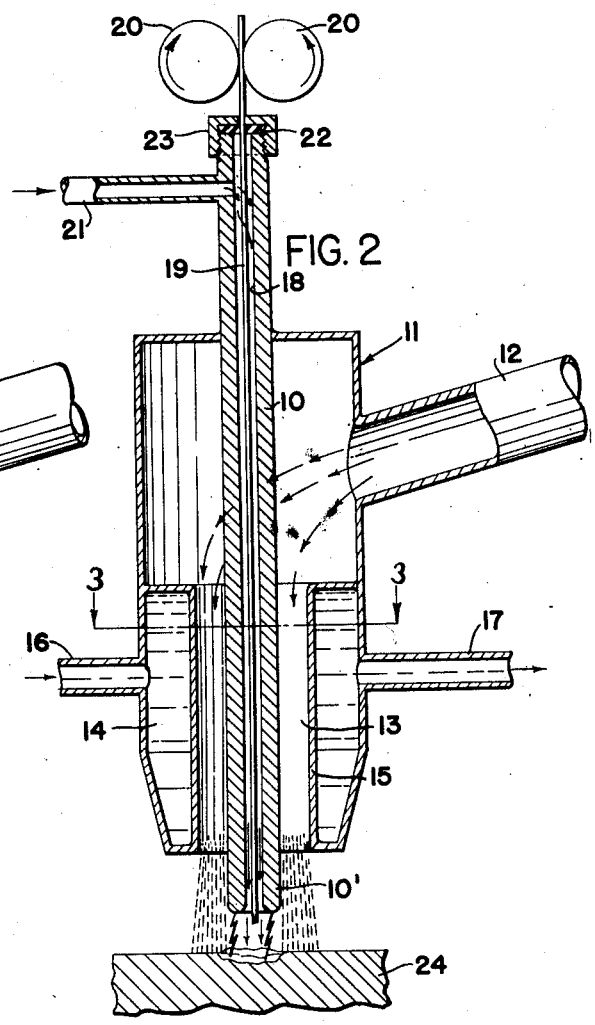
INVENTOR.
JAMES H. JOHNSTON
BY Ely, Frye & Hamilton
ATTORNEYS

United States Patent Office 2,819,383
Patented Jan. 7, 1958

2,819,383

METHOD OF ARC WELDING TITANIUM

James H. Johnston, Cambridge, Mass.

Application September 20, 1952, Serial No. 310,588

4 Claims. (Cl. 219—118)

The invention relates to the arc-welding of titanium and other metals having similar characteristics, and more specifically to a novel method of arc-welding titanium and titanium alloys so as to produce a ductile weld.

It is common practice in arc welding to surround the welding zone with an inert gas to prevent the pick-up of contaminants from the air which have a deleterious effect upon the metal being welded. The inert gas may be helium or argon and may be continuously supplied to form a curtain around the tip of the electrode, and such a shield or curtain is quite effective in successfully welding a number of metals. In the case of titanium, however, the metal is so highly reactive to oxygen and nitrogen even in very small quantities that the usual inert gas shield does not prevent embrittlement of the weld due to the formation of titanium oxide and titanium nitride. The same is true of other highly reactive metals related to titanium.

There are several sources of oxygen and nitrogen which are not fully avoided by the use of an inert gas shield in arc welding titanium, including oxygen and nitrogen present as impurities in commercially available inert gases, oxygen and nitrogen from the surrounding air diffusing into the inert gas shield and being drawn into the gas shield by the turbulence generated by the arc, and oxygen and nitrogen dissolved in the base metal or present in oxides or nitrides on the surface thereof. Experiments have shown that the percentage of elongation and ductility of the weld in the case of commercially pure titanium is greatly reduced due to the presence of as little as .1% oxygen and nitrogen, and decreases rapidly as the percentage of oxygen and nitrogen increases slightly, and that the effect is even more pronounced in the case of commercially available titanium alloys.

I am aware that Patent No. 2,576,793 proposes the welding of titanium by substituting carbon tetrachloride gas for all or part of the inert gas in the inert gas shield welding process, and the carbon tetrachloride is a gas which reacts with solid titanium oxide to form vaporous titanium chloride and carbon monoxide which partly dissolves in the weld and partly passes off as a gas. The carbon tetrachloride is very toxic, and the welder must be protected against its effects, as set forth in column 2, line 21 of the patent. Also, the carbon tetrachloride cannot be introduced directly into the arc as it extinguishes the arc and prevents welding. Another disadvantage of this process is that the reaction makes carbon available to go into solution in titanium and this also has an embrittling effect on titanium.

An object of the present invention is to provide a novel method for arc welding titanium in which a volatile metal such as calcium is fed into the welding arc shielded by inert gas to react with or scavenge the oxygen and nitrogen present and reduce solid titanium oxide to form titanium and unreactive oxides which float off harmlessly from the molten weld.

Another object is to provide a novel method of welding titanium in which neither the substances added to the weld nor the reaction products have any toxic or other deleterious effects on the operator.

A further object is to provide a novel method which produces a ductile weld with commercially pure titanium and certain of its commercially available alloys.

These and other related objects are accomplished by the method and method steps of the present invention, a preferred embodiment of which is described by way of example herein and illustrated in the accompanying drawing, the scope of the invention being defined in the appended claims.

Referring to the drawing in which a welding apparatus for carrying out the invention is shown schematically:

Fig. 1 is a side elevation of an arc-welding torch showing the tip positioned adjacent the base metal;

Fig. 2 is a sectional view thereof; and

Fig. 3 is a transverse sectional view as on line 3—3, Fig. 1.

The welding apparatus illustrated is of the type known as a "heliarc" welding torch having a shield surrounding the electrode and discharging a curtain of inert gas such as helium or argon around the arc formed at the tip of the electrode. The electrode, which is usually tungsten or tungsten alloy, is indicated at 10 and the metal shield indicated generally at 11 surrounds the electrode. A gas supply pipe 12, carrying inert gas such as argon or helium, is connected to the upper part of the shield 11, and the gas passes downwardly through an annular passageway 13 around the electrode and is discharged from the bottom end or nozzle of the shield to form a curtain around the tip of the electrode, as indicated by the broken lines in Fig. 2.

Preferably, a jacket 14 for cooling medium is formed by the outer wall of the shield and the annular wall 15 forming the passageway 13, and inlet and outlet pipes 16 and 17 circulate a cooling medium such as water through said nozzle jacket. The electrode 10 may be secured in any suitable manner to the top and bottom walls of the shield 11, and the tip of the electrode may be made replaceable in a well known manner, but such details form no part of the present invention.

For the purpose of carrying out the present invention the electrode is preferably provided with a through axial bore 18 through which a rod or wire 19 of volatile reactive metal is fed into the welding arc. If desired, a hollow tungsten electrode tip may be detachably secured on the lower end of a hollow tube of another metal such as copper, in which case the copper tube should be water cooled, and the rod fed through the copper tube and hollow tungsten tip attached thereto. However, for the purpose of clarity in illustrating the method of the present invention, the hollow electrode 10 is shown as one continuous tube of tungsten.

The rod or wire 19 is preferably calcium, although it may be made of other volatile reactive metals such as sodium, aluminum or magnesium, or their lower melting alloys. The wire 19 may be fed downwardly through the bore 18 by hand or in any suitable manner, and I have shown a pair of feed rolls 20 for that purpose. The rolls 20 may be suitably supported at the top of the electrode and motor driven if desired.

The cross sectional area of the bore 18 is substantially larger than that of the wire 19, and preferably at the upper end of the electrode is a small pipe 21 connected to said bore for supplying inert gas such as argon or helium to said bore. This gas prevents reaction of the wire with the atmosphere and forms a protective shield around the wire within the arc generated between the tip of the electrode and the base metal, as shown in Fig. 2, so as to exclude contaminants and replace the vacuum formed by the products of the reaction at that point. A flexible washer 22 is secured by a metal cap 23 to the top of the electrode to prevent the escape of inert gas around the wire 19.

In carrying out the method according to my invention the inert gas supplied through pipe 12 maintains a shield or curtain around the hollow arc generated between the tubular tip 10' of the electrode and the base metal 24. The calcium or other volatile metal wire 19 is fed slowly into the arc where it volatilizes and reacts rapidly with the oxygen and nitrogen contaminants in the gas curtain and the base metal to scavenge the pool of molten metal and the atmosphere within the shield of inert gas. I prefer to use a calcium wire for this purpose because magnesium and aluminum are not as effective with nitrogen. It is to be understood that within the scope of the invention the calcium wire may be fed into the arc from one side and a conventional solid tungsten electrode used, in which case a separate inert gas tube would be provided around the wire to shield it until it reaches the arc.

As the calcium vaporizes it reacts with the oxygen and nitrogen present to form unreactive oxides and nitrides, and the resulting vacuum is displaced with inert gas. Some of the vapor may be driven out into the surrounding curtain where it condenses in liquid or dust form, which is still reactive to oxygen and nitrogen in the surrounding air. The volume of air thus picked up is immediately supplanted with argon or helium discharging from the gas shield.

The principal reactions involved are:

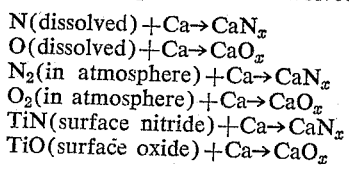

The calcium oxide and nitride which are formed from the reaction of calcium vapor with oxygen and nitrogen impurities are physically discouraged from entering the weld by the violence of the metal gas expansion. However, any of these products which do reach the weld are principally substantially insoluble in titanium and they float off harmlessly from the weld pool. Pure titanium is actually a product of the reaction when $TiO_2$ is present. In contrast, in conventional arc welding with an inert gas shield, the oxygen and nitrogen impurities in the inert gas and the surrounding air are free to go directly into solution in the weld puddle.

After the weld is complete, and during cooling thereof to about 1200° F. there is a tendency of the weld to assimilate small amounts of oxygen and nitrogen, which may cause some embrittlement, and this tendency may be overcome by applying a powder or liquid composition containing calcium or other reactive volatile metal including sodium, magnesium and aluminum or their compounds, or combinations thereof.

The novel method comprising the present invention has been found to produce ductile welds in commercial pure titanium and certain of its alloys, excellent results having been obtained with the commercial titanium alloys known as RC130A which contains 7% manganese and not over 0.2% carbon, and RC130B which contains 4% aluminum, 4% manganese and not over 0.2% carbon. However, I do not wish the method to be limited in its application or in respect to the volatile reactive metals employed, except by the scope of the appended claims.

I claim:

1. A method of arc-welding titanium and alloys thereof to produce a weldment substantially free of atmospheric contaminants such as oxygen, comprising the steps of, generating an arc between a body of titanium and an electrode to form a molten pool, maintaining a shield of inert gas around the arc and pool, and feeding into the arc a consumable rod containing calcium, the rate at which said rod is fed into the arc being such that the amount of calcium vaporized will be at least sufficient to scavenge both the pool of metal and the atmosphere within the shield to remove said contaminants therefrom as compounds of calcium insoluble in molten titanium.

2. A method of arc-welding titanium and alloys thereof to produce a weldment substantially free of atmospheric contaminants such as oxygen, comprising the steps of, generating an arc between a body of titanium and an electrode to form a molten pool, maintaining a shield of inert gas around the arc and pool, and feeding into the arc a consumable rod containing a volatile metal selected from the class consisting of calcium and magnesium, the rate at which said rod is fed into the arc being such that the amount of volatile metal vaporized will be at least sufficient to scavenge both the pool of metal and the atmosphere within the shield to remove said contaminants therefrom as a compound of the volatile metal insoluble in molten titanium.

3. A method of arc-welding titanium and alloys thereof to produce a weldment substantially free of atmospheric contaminants such as oxygen, comprising the steps of, generating a hollow arc between a body of titanium and an electrode to form a molten pool, maintaining a shield of inert gas around the arc and pool, and feeding into the center of the arc a consumable rod containing calcium, the rate at which said rod is fed into the arc being such that the amount of calcium vaporized will be at least sufficient to scavenge both the pool of metal and the atmosphere within the shield to remove said contaminants therefrom as compounds of calcium insoluble in molten titanium.

4. A method of arc-welding titanium and alloys thereof to produce a weldment substantially free of atmospheric contaminants such as oxygen, comprising the steps of, generating a hollow arc between a body of titanium and an electrode to form a molten pool, maintaining a shield of inert gas around the arc and pool, and feeding into the center of the arc a consumable rod containing a volatile metal selected from the class consisting of calcium and magnesium, the rate at which said rod is fed into the arc being such that the amount of volatile metal vaporized will be at least sufficient to scavenge both the pool of metal and the atmosphere within the shield to remove said contaminants therefrom as a compound of the volatile metal insoluble in molten titanium.

References Cited in the file of this patent

UNITED STATES PATENTS

| | | |
|---|---|---|
| 1,589,017 | Lincoln | June 15, 1926 |
| 1,966,260 | Munson | July 10, 1934 |
| 1,978,317 | Miller | Oct. 23, 1934 |
| 2,121,693 | Henderson | June 21, 1938 |
| 2,446,598 | Klinke | Aug. 10, 1948 |
| 2,576,793 | Jordan | Nov. 27, 1951 |
| 2,694,763 | Muller | Nov. 16, 1954 |

FOREIGN PATENTS

| | | |
|---|---|---|
| 495,299 | Great Britain | Nov. 10, 1938 |
| 546,961 | Great Britain | Aug. 7, 1942 |